United States Patent [19]

Theurer

[11] Patent Number: 5,099,097
[45] Date of Patent: Mar. 24, 1992

[54] MOBILE ELECTRIC FLASH-BUTT WELDING UNIT

[75] Inventor: Josef Theurer, Vienna, Austria

[73] Assignee: Franz Plasser Bahnbaumaschinen-Industriegesellschaft m.b.H., Vienna, Austria

[21] Appl. No.: 708,672

[22] Filed: May 31, 1991

[30] Foreign Application Priority Data

Jun. 15, 1990 [AT] Austria .................... 1295/90

[51] Int. Cl.⁵ ............................. B23K 11/04
[52] U.S. Cl. ............................. 219/53; 219/97
[58] Field of Search ............. 219/53, 55, 97, 100

[56] References Cited

U.S. PATENT DOCUMENTS 4,929,816  5/1990  Theurer et al. .

FOREIGN PATENT DOCUMENTS 1465042  7/1969  Fed. Rep. of Germany .
632948  11/1982  Switzerland .
2104818  3/1983  United Kingdom .

*Primary Examiner*—Clifford C. Shaw
*Attorney, Agent, or Firm*—Collard, Roe & Galgano

[57] ABSTRACT

A mobile electric flash-butt welding unit for welding together adjacent ends of track rail sections comprises a pair of welding heads displaceable in a longitudinal direction towards each other, each welding head comprising two tong-like parts pivotal towards each other and carrying clamping electrodes for engaging the sides of a respective one of the rail section ends. Actuating cylinders extend in the longitudinal direction and are connected to each welding head for pressing the welding heads in the longitudinal direction towards each other, and clamps are connected to each welding head and are spaced in the longitudinal direction from the actuating cylinders connected thereto, each clamp comprising jaws for gripping the sides of the respective rail section end therebetween.

8 Claims, 2 Drawing Sheets

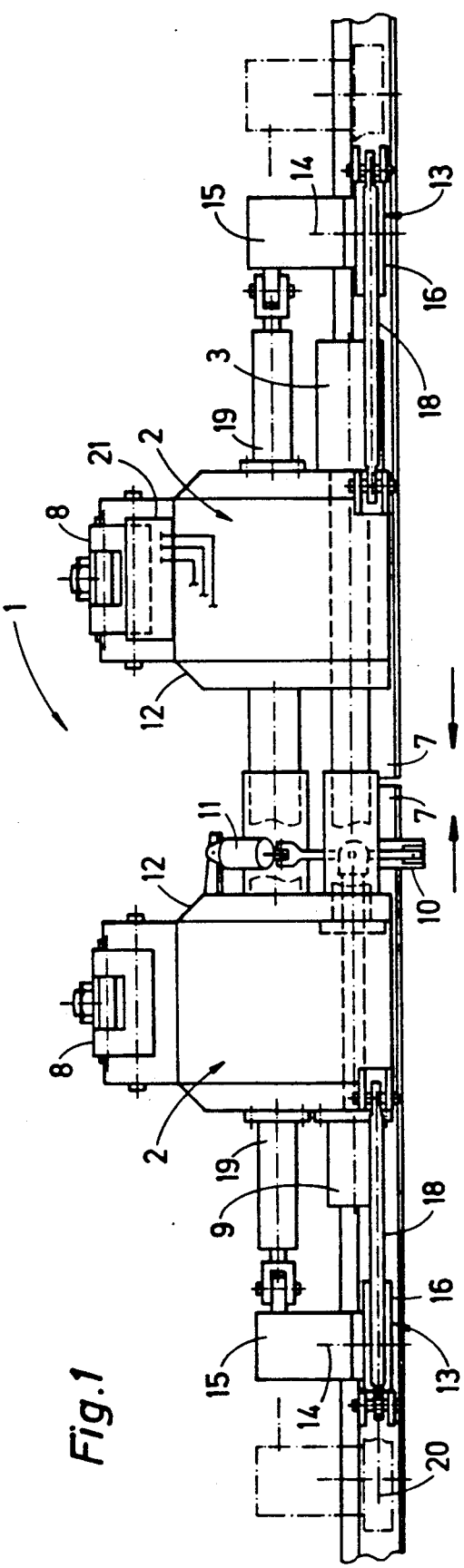
Fig.1
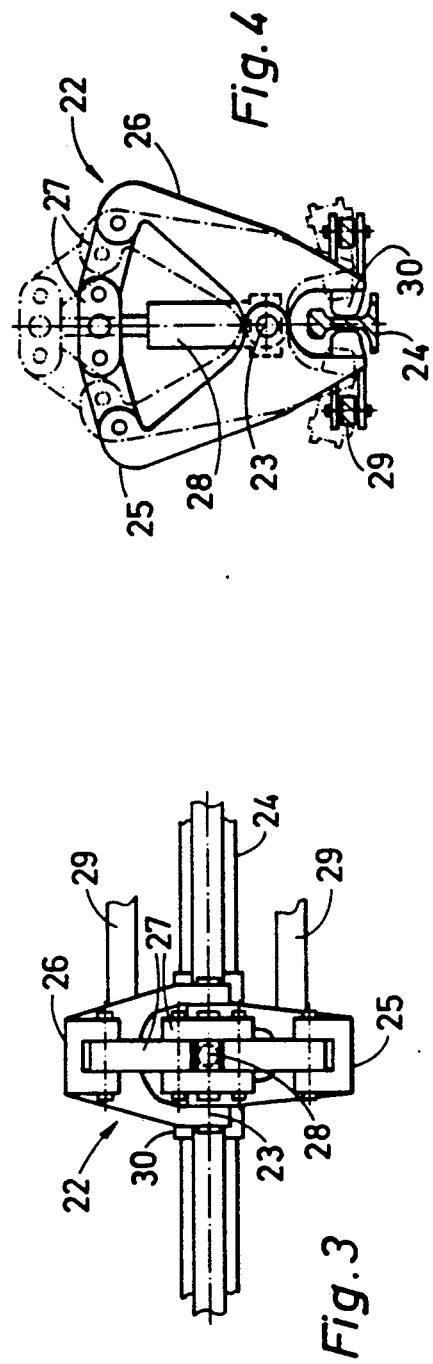
Fig.4
Fig.3

MOBILE ELECTRIC FLASH-BUTT WELDING UNIT

BACKGROUND OF THE INVENTION

1. Field of the Invention

The present invention relates to a mobile electric flash-butt welding unit for welding together adjacent ends of track rail sections extending in a longitudinal direction, each track rail section having a gage side and a field side, and the welding unit comprising a pair of welding heads displaceable in the longitudinal direction towards each other, each welding head comprising two tong-like parts pivotal towards each other and carrying clamping electrodes for engaging the sides of a respective one of the rail section ends, and actuating cylinder means extending in the longitudinal direction and connected to each welding head for pressing the welding heads in the longitudinal direction towards each other.

2. Description of the Prior Art

U.S. Pat. No. 4,929,816, dated May 29, 1990, discloses such an electric flash-butt welding unit vertically adjustably mounted on a mobile machine running on the track. The pivotal clamping and welding tongs are pressed by hydraulic cylinders into gripping engagement with the sides of the rail section webs and serve simultaneously as electrodes for the welding current and for clamping the rail section ends therebetween. Flash-butt welding is effected by operating hydraulic cylinders connected to the welding heads to press the welding heads and the rail section ends gripped thereby towards each other at a speed of about 0.25 mm per second and conducting electric current through the electrodes. When the rail section ends come into contact with each other, the electric current reaches a first peak value and the movement of the welding heads towards each other is stopped to obtain a suitable melting temperature. The flash-butt welding operation is concluded by a compression stroke which causes the abutting rail section ends heated to the melting temperature to be pressed against each other under very high compression forces. To facilitate the compression stroke, particularly in the case of very long and heavy rail sections, the welding heads are surrounded by a ring-shaped rail tensioning mechanism. This mechanism comprises pivotal tongs with clamping jaws for grippingly engaging the sides of the webs of both rail sections. The compression stroke is effected by the synchronous operation of the cylinders pressing the welding heads towards each other and cylinder pivoting the tongs into gripping engagement with the web sides of the rail sections.

German patent No. 1,465,042, published July 31, 1969, also discloses a flash-butt welding unit for welding together adjacent ends of track rail sections. This unit comprises two welding heads longitudinally displaceable towards each other by cylinders extending in a longitudinal direction, each welding head comprising two parts pivotal towards each other about a longitudinally extending axis. Clamping electrodes are mounted on lower ends of the welding head parts for engaging the sides of the rail section ends, and a cylinder connects the upper ends of the welding head parts for pivoting the same into engagement with the rail section end sides.

Swiss patent No. 632,948, dated Nov. 15, 1982, discloses a stationary welding unit with a complex mechanism for centering adjacent profiled rod ends to be welded together. To provide the required welding pressure, a clamping device is longitudinally displaceable by means of pressure cylinders which are connected to a fixed support. This differs fundamentally from the welding unit of this invention, which comprises two longitudinally displaceable welding heads pressed against each other by actuating cylinders, which arrangement makes the complicated centering mechanism of this patent unnecessary.

British patent application No. 2,104,818, published Mar. 16, 1983, discloses a mobile welding unit including a fixed assembly and an assembly movable towards the fixed assembly. Each assembly has two clamping devices for aligning the adjacent rail section ends during welding.

SUMMARY OF THE INVENTION

It is the primary object of the invention to provide a simple structural modification of a mobile electric flash-butt welding unit of the first-described type, which assures the application of very high tensile forces to the rail section ends being welded together.

The above and other objects are accomplished in such a welding unit according to the present invention with clamping means connected to each welding head and spaced in the longitudinal direction from the actuating cylinder means connected thereto, each clamping means comprising elements for gripping the sides of the respective rail section end therebetween.

This arrangement provides a structural unit which requires minimal retrofitting of existing flash-butt welding units which have operated very efficiently and avoids undue stress on the clamping electrodes while enabling considerably higher tensile forces to be applied to the rail section ends to be welded together. The mechanical connection of the clamping means to the two welding heads enables the synchronous transmission of the tensile forces to the rail section ends by the clamping means as well as the clamping and welding tongs operating as welding electrodes without the need for costly and complicated synchronizing controls. Such synchronization is assured by connecting the clamping means to the welding heads for simultaneous longitudinal displacement therewith. Furthermore, since the clamping means are arranged outside the welding heads, they may be massive and of large dimensions because they need not take into account the structure of the welding head. Thus, such clamping means may be of a size assuring effective gripping even of very long and heavy rail sections.

If the actuator cylinder means comprises four actuating cylinders connecting facing ends of the welding heads to each other and extending parallel to each other in a common horizontal plane, the clamping means being connected to ends of the welding heads opposite the facing ends, the tensile forces applied to the welding heads for their longitudinal displacement towards each other will be considerably increased and, by arranging the actuating cylinders in a common horizontal plane, the longitudinal axes of these cylinders will be located immediately adjacent a horizontal plane of symmetry of the clamping means jaws.

According to a preferred feature of this invention, the welding unit further comprises a device for shearing off a welding bead at the adjacent rail section ends, two operating cylinders connected to the shearing device for longitudinally displacing the shearing device, and a cylinder linked to the housing of one of the welding heads and connected to the shearing device for pressing the shearing device against the welding bead. This enables the welding bead shearing device to be longitudinally displaced while the two welding heads are held at a constant distance, making it possible to remove the welding bead without difficulty while the compression force at the welded rail section ends remains unchanged. The tensile force is relaxed only after the weld has cooled off.

According to one preferred embodiment of the invention, the clamping means elements are pivotal tongs extending transversely to the longitudinal direction and being arranged at respective sides of the respective rail section end opposite each other, the clamping means further comprising a bearing extending transversely to the longitudinal direction and connecting the pivotal tongs, one end of each tong being mounted on the bearing for pivoting about an axis extending transversely to the longitudinal direction, and a traction member linked to the housing and connected to an end of a respective one of the tongs opposite the one tong end for pivoting the tongs into gripping engagement with the rail section end sides whereby the tongs operate as levers. This provides a very simple structure of the clamping means while the clamping tongs effectively operate as levers. At the same time, the operation of the clamping means in no way interferes with the operation of the welding heads. In this embodiment, it is advantageous to provide at least one spreading cylinder extending parallel to the actuating cylinder and connecting the bearing to the welding head. This enables the opening and closing motions of the clamping tongs to be exactly controlled while the traction members connecting the clamping tongs to the welding heads may be simply structured for the trouble-free transmission of very high tensile forces without changing their length. Arranging two spreading cylinders symmetrically at opposite sides of a longitudinal center line of the welding head above a respective one of the actuating cylinders will provide a uniform and symmetrical longitudinal displacement of the bearing connecting the two clamping tongs for opening and closing the tongs out of, and into, engagement with the rail section ends.

Preferably, the clamping means further comprises a clamping jaw on each pivotal tong for gripping the rail section end sides, the pivotal tongs and the traction members being arranged symmetrically with respect to a common plane of symmetry extending perpendicularly to the pivoting axis and centered with respect to the clamping jaws. This arrangement has the advantage that high tensile forces are transmitted to the rail section ends without exerting torsion on the pivoting axes of the clamping tongs. This avoids a very disadvantageous bending stress on the pivoting axles of the clamping tongs and on the rail section ends. If the traction members are linked to the housing for pivoting about respective axes extending in the longitudinal direction and in a vertical direction extending perpendicularly thereto, a trouble-free disengagement of the pivoting clamping jaws from the rail section ends is assured.

According to another preferred embodiment, the clamping means elements are tongs pivotal about an axis extending in the longitudinal direction for grippingly engaging the rail section end sides, and the clamping means further comprises a vertical clamping cylinder extending perpendicularly to the longitudinal direction above the axis and connecting the pivotal tongs, and traction members connecting the pivotal tongs to the welding head. This arrangement enables the clamping force to be controlled by an independently operated clamping cylinder independently of the longitudinally extending tensile forces.

BRIEF DESCRIPTION OF THE DRAWING

The above and other objects, advantages and features of the present invention will become more apparent from the following detailed description of certain now preferred embodiments thereof, taken in conjunction with the accompanying, somewhat schematic drawing wherein FIG. 1 is a side elevational view of one embodiment of an electric flash-butt welding unit according to this invention;

FIG. 3 is an enlarged, fragmentary top view showing another embodiment of the, clamping means; and FIG. 4 is an end view of the clamping means of FIG. 3.

DETAILED DESCRIPTION OF PREFERRED EMBODIMENTS

Figure 2:
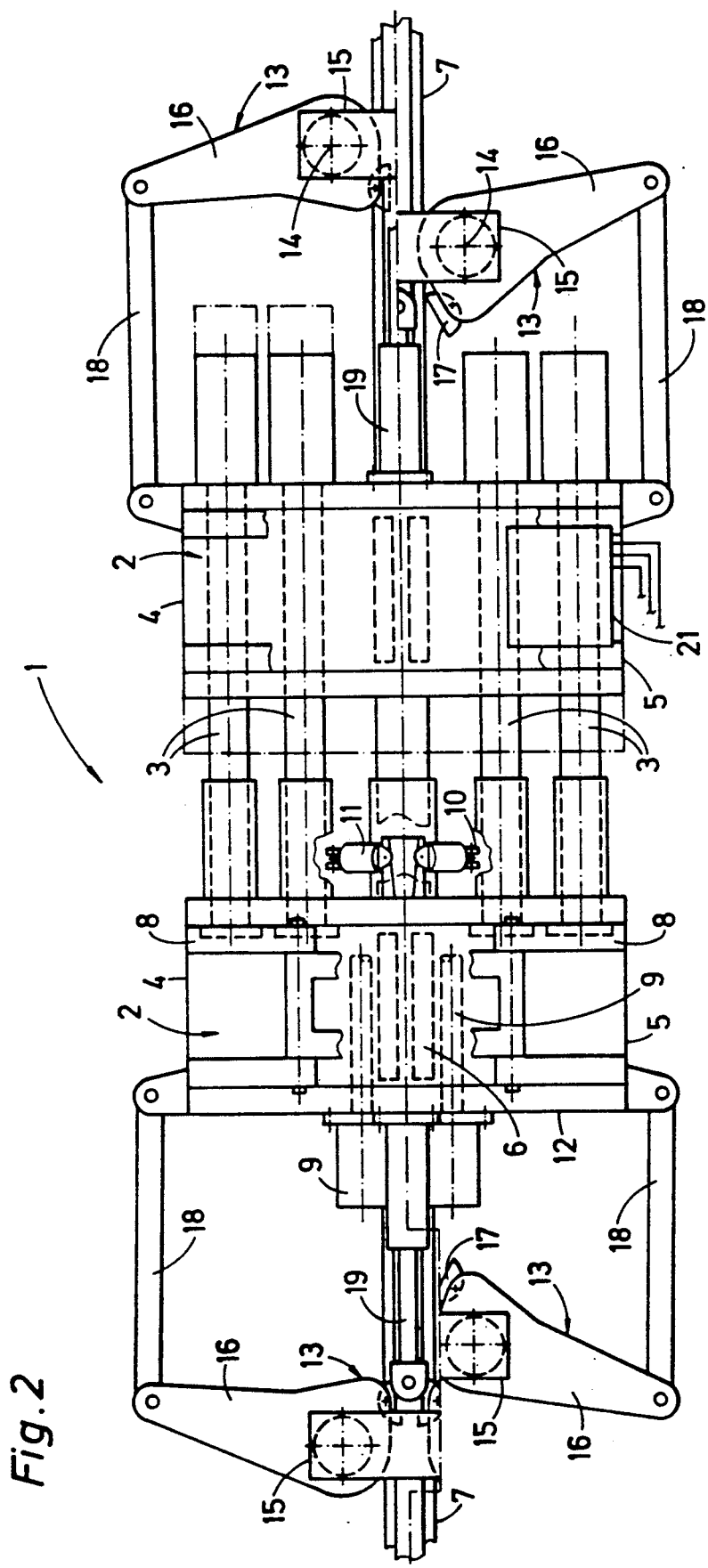
FIG. 2 is a top view of the welding unit, the clamping means elements being shown in their open position, wherein they are disengaged from the rail section ends, in the lower half of the figure while they are shown in their closed position engaged with the rail section ends in the upper half of the figure.

Referring now to the drawing and first to FIGS. 1 and 2, there is shown mobile electric flash-butt welding unit 1 for welding together adjacent ends 7 of track rail sections extending in a longitudinal direction. Each track rail section has a gage side and a field side, and welding unit 1 comprises a pair of welding heads 2 displaceable in the longitudinal direction towards each other, as indicated by two horizontal arrows pointing towards each other. Each welding head 2 comprises two tong-like parts 4, 5 pivotal towards each other about an axis extending in the longitudinal direction and carrying clamping electrodes 6 for engaging the sides of a respective rail section end 7. A lever system 8 connects the upper ends of pivotal welding head parts 4, 5 to each other, and a vertical spreading cylinder is connected to the lever system for pressing clamping electrodes 6 into engagement with rail section ends 7. This welding head structure is generally conventional. It further comprises four actuating cylinders 3 extending in the longitudinal direction and connected to each welding head 2 for pressing the welding heads in the longitudinal direction towards each other. As shown, the four actuating cylinders connect facing ends of the welding heads 2 to each other and extend parallel to each other in a common horizontal plane. Welding unit 1 further comprises device 10 for shearing off a welding bead at adjacent rail section ends 7, two operating cylinders 9 connected to the shearing device for longitudinally displacing the shearing device, and a cylinder 11 linked to housing 12 of one welding head 2 and connected to shearing device 10 for pressing the shearing device against the welding bead.

According to the invention, clamping means 13 are connected to ends of the welding heads opposite the facing ends and are spaced in the longitudinal direction from actuating cylinders 3 connected thereto, each clamping means comprising elements for gripping the sides of the respective rail section end therebetween. In the embodiment illustrated in FIGS. 1 and 2, the clamping means elements are pivotal tongs 16 extending transversely to the longitudinal direction and being arranged at respective sides of the respective rail section end 7 opposite each other (see FIG. 2), and the clamping means further comprises bearing 15 extending transversely to the longitudinal direction and connecting pivotal tongs 16. One end of each tong 16 is mounted on the bearing for pivoting about vertical axis 14 extending perpendicularly to the longitudinal direction, and traction member 18 is linked to housing 12 of the welding head and is connected to an end of a respective tong 16 opposite the one tong end for pivoting the tongs into gripping engagement with the rail section end sides whereby the tongs operate as levers. Thus, each tong 16 has a short lever arm carrying a clamping jaw 17 engageable with a respective rail section end side for gripping the rail section end sides and a long lever arm linked to welding head housing 12 by traction member 18. Spreading cylinder 19 extends parallel to the actuating cylinders 4 centrally between traction members 18 and connects each bearing 15 to connected welding head 2.

As shown in FIG. 1, pivotal tongs 16 and traction members 18 are arranged symmetrically with respect to a common plane of symmetry 20 extending perpendicularly to pivoting axis 14 and centered with respect to clamping jaws 17, i.e. passing through the middle of the vertical extension of the clamping jaws and the rail section end webs gripped thereby. Traction members 18 are preferably linked to welding head housing 12 for pivoting about respective axes extending in the longitudinal direction and in a vertical direction extending perpendicularly thereto.

As is conventional, the secondary circuit of an electric power supply is built into flash-butt welding unit 1 to transform the welding current to a low voltage and the required high amperage. Since this current transformation and the welding operation generate very high temperatures, the welding heads are suitably cooled, the required cooling system being conventional and not shown. As is also conventional, flash-butt unit 1 may be suspended from a double-armed, telescopic crane boom affixed to a welding machine running on the track. The machine carries such energy supplies as an electric generator and a hydraulic fluid pump for operating the cylinders. The welding operations are controlled from control panel 21.

In operation, the crane boom of the welding machine will center flash-butt welding unit 1 over adjacent rail section ends 7, 7 to be welded together, as shown in FIG. 1, while clamping tongs 16 and welding head parts 4, 5 are in their open positions (see lower half of FIG. 1), i.e. they are disengaged from the field and gage sides of the rail section ends. After the welding unit has been placed on the rail heads of the adjacent rail section ends, spreading cylinders 19 are operated in opposite directions to move clamping jaws 17 into gripping engagement with the rail section end sides (see upper half of FIG. 1). At the same time, the spreading cylinders (not shown) connected to lever system 8 are operated to pivot welding head parts 4, 5 towards each other and thus to engage clamping electrodes 6 with the webs of the rail section ends. In this way, adjacent rail section ends 7, 7 are clamped in exact alignment with each other.

Subsequently, actuating cylinders 3 are operated to move welding heads 2, 2 and clamping means 13, 13 connected thereto towards each other in the longitudinal direction. During this displacement, the bell crank lever structure of pivotal clamping tongs 16 will automatically cause clamping jaws 17 to press more strongly against the rail section end webs, the required tensile forces being applied to adjacent rail section ends 7, 7 not only by clamping electrodes 6 but also by clamping jaws 17. In this way, the rail section ends are pulled together until their spacing has been reduced to a gap permitting the formation of an electric arc between the rail section ends for generating sufficient energy for welding the rail section ends together. After the programmed welding temperature has been reached, increased pressure is applied to actuating cylinders 3 to produce the compression stroke required for flash-butt welding. This causes the two rail section ends, which have been heated to the melting temperature, to be pressed together to obtain the weld between the rail section ends. The very high compression forces are obtained by the combined operation of clamping electrodes 6 and clamping tongs 16 forming an operational unit, and their synchronous operation makes a complex control for these two clamping forces unnecessary. The compression forces are applied until the welded rail section ends have sufficiently cooled to provide a permanent weld, and the resultant weld bead is sheared off by operating cylinders 9 and 11 to displace weld bead shearing device 10 longitudinally into alignment with the weld bead and pressing it into engagement therewith. After the weld has cooled, the pressure in actuating cylinders 3 is relieved, the spreading cylinders operating the pivoting of clamping tongs 16 and welding head parts 4, 5 are actuated to disengage the clamping jaws 17 and clamping electrodes 6 from the rail section end sides, and welding heads 2, 2 are longitudinally moved apart into their starting position in a direction opposite to that indicated by the horizontal arrows in FIG. 1.

In the embodiment illustrated in FIGS. 3 and 4, the clamping means elements are tongs 25, 26 pivotal about axis 23 extending in the longitudinal direction for grippingly engaging the field and gage sides of rail section end 24. This clamping means further comprises vertical clamping cylinder 28 extending perpendicularly to the longitudinal direction above axis 23 and connected to link 27 connecting the upper ends of pivotal tongs 25, 26. Operation of clamping cylinder 28 will move the pivotal tongs between a clamping position shown in full lines in FIG. 4 and open position shown in phantom lines. Two traction members 29 connect the lower ends of pivotal tongs 25, 26 to the welding head. The traction members are so connected to pivotal tongs 25, 26 that a slight turning of traction members 29 about a longitudinally extending axis will effect the opening movement of the pivotal tongs. The lower ends of pivotal tongs 24, 25 carry clamping jaws 30 for grippingly engaging the sides of the web of rail section end 24.

During a welding operation, clamping electrodes 6 and clamping jaws 30 are simultaneously pivoted into gripping engagement with the sides of the webs of the rail section ends and, as actuating cylinders 3 are operated to press the adjacent rail section ends towards each other, the two rail section ends are welded together in the manner described hereinabove.

What is claimed is:
1. A mobile electric flash-butt welding unit for welding together adjacent ends of track rail sections extending in a longitudinal direction, each track rail section having a gage side and a field side, and the welding unit comprising
  (a) a pair of welding heads displaceable in the longitudinal direction towards each other, each welding head comprising
    (1) two tong-like parts pivotal towards each other and carrying clamping electrodes for engaging the sides of a respective one of the rail section ends,
  (b) actuating cylinder means extending in the longitudinal direction and connected to each welding head for pressing the welding heads in the longitudinal direction towards each other, and
  (c) clamping means connected to each welding head and spaced in the longitudinal direction from the actuating cylinder connected thereto, each clamping means comprising elements for gripping the sides of the respective rail section end therebetween.

2. The mobile electric flash-butt welding unit of claim 1, wherein the actuating cylinder means comprises four actuating cylinders connecting facing ends of the welding heads to each other and extending parallel to each other in a common horizontal plane, the clamping means being connected to ends of the welding heads opposite the facing ends.

3. The mobile electric flash-butt welding unit of claim 1, wherein at least one of the welding heads comprises a housing, and further comprising a device for shearing off a welding bead at the adjacent rail section ends, two operating cylinders connected to the shearing device for longitudinally displacing the shearing device, and a cylinder linked to the housing and connected to the shearing device for pressing the shearing device against the welding bead.

4. The mobile electric flash-butt welding unit of claim 1, wherein each welding head comprises a housing and the clamping means elements are pivotal tongs extending transversely to the longitudinal direction and being arranged at respective sides of the respective rail section end opposite each other, the clamping means further comprising a bearing extending transversely to the longitudinal direction and connecting the pivotal tongs, one end of each tong being mounted on the bearing for pivoting about a vertical axis extending perpendicularly to the longitudinal direction, and a traction member linked to the housing and connected to an end of a respective one of the tongs opposite the one tong end for pivoting the tongs into gripping engagement with the rail section end sides whereby the tongs operate as levers.

5. The mobile electric flash-butt welding unit of claim 4, further comprising at least one spreading cylinder extending parallel to the actuating cylinder and connecting the bearing to the welding head.

6. The mobile electric flash-butt welding unit of claim 4, further comprising a clamping jaw on each pivotal tong for gripping the rail section end sides, the pivotal tongs and the traction members being arranged symmetrically with respect to a common plane of symmetry extending perpendicularly to the pivoting axis and centered with respect to the clamping jaws.

7. The mobile electric flash-butt welding unit of claim 6, wherein the traction members are linked to the housing for pivoting about respective axes extending in the longitudinal direction and in a vertical direction extending perpendicularly thereto.

8. The mobile electric flash-butt welding unit of claim 1, wherein the clamping means elements are tongs pivotal about an axis extending in the longitudinal direction for grippingly engaging the rail section end sides, and the clamping means further comprises a vertical clamping cylinder extending perpendicularly to the longitudinal direction above the axis and connecting the pivotal tongs, and traction members connecting the pivotal tongs to the welding head.

* * * * *